US008447833B2

(12) United States Patent
Nightingale et al.

(10) Patent No.: US 8,447,833 B2
(45) Date of Patent: May 21, 2013

(54) READING AND WRITING DURING CLUSTER GROWTH PHASE

(75) Inventors: Edmund B. Nightingale, Redmond, WA (US); Jeremy E. Elson, Seattle, WA (US); Jonathan R. Howell, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/412,944

(22) Filed: Mar. 6, 2012

(65) Prior Publication Data
US 2012/0166590 A1    Jun. 28, 2012

Related U.S. Application Data

(63) Continuation-in-part of application No. 12/763,107, filed on Apr. 19, 2010, and a continuation-in-part of application No. 12/763,133, filed on Apr. 19, 2010, now Pat. No. 8,181,061, and a continuation-in-part of application No. 13/017,193, filed on Jan. 31, 2011, and a continuation-in-part of application No. 13/096,194, filed on Apr. 28, 2011, and a continuation-in-part of application No. 13/112,978, filed on May 20, 2011, and a continuation-in-part of application No. 13/116,270, filed on May 26, 2011.

(51) Int. Cl.
*G06F 3/16*      (2006.01)
*G06F 15/16*     (2006.01)

(52) U.S. Cl.
USPC ............ 709/217; 709/220; 709/227; 709/229

(58) Field of Classification Search
USPC .................. 709/203, 227, 228, 217, 220, 229
See application file for complete search history.

(56) References Cited

U.S. PATENT DOCUMENTS

| 4,491,945 A | 1/1985  | Turner         |
|-------------|---------|----------------|
| 4,780,870 A | 10/1988 | McHarg et al.  |
| 5,305,320 A | 4/1994  | Andrews et al. |
| 5,408,649 A | 4/1995  | Beshears et al.|

(Continued)

FOREIGN PATENT DOCUMENTS
WO    WO2010108368 A1    9/2010

OTHER PUBLICATIONS

Isard, et al., "Dryad: Distributed Data-Parallel Programs from Sequential Building Blocks", In Proceedings of the 2nd ACM/SIGOPS/EuroSys European Conference on Computer Systems, Mar. 21, 2007, 14 pages.

(Continued)

*Primary Examiner* — Khanh Dinh
(74) *Attorney, Agent, or Firm* — Lee & Hayes, PLLC

(57) ABSTRACT

A client device configured to write to both a growth server and a live server replica that the growth server is replacing during a growth phase is described herein. The client device first determines the growth server designated to replace a corresponding live server replica of a set of server replicas associated with a storage index. The client device then transmits a write request associated with the storage index to the set of server replicas and to the growth server. The client device may perform the determining based on storage assignment mappings. The storage assignment mappings are provided to the client device by a metadata server while the growth server retrieves data associated with the storage index from the live server replica.

19 Claims, 13 Drawing Sheets

U.S. PATENT DOCUMENTS

| | | | |
|---|---|---|---|
| 5,423,046 A | 6/1995 | Nunnelley et al. | |
| 5,553,285 A | 9/1996 | Krakauer et al. | |
| 5,621,884 A | 4/1997 | Beshears et al. | |
| 5,663,951 A | 9/1997 | Danneels et al. | |
| 5,914,878 A * | 6/1999 | Yamamoto et al. | 700/106 |
| 5,938,732 A * | 8/1999 | Lim et al. | 709/229 |
| 6,424,979 B1 | 7/2002 | Livingston et al. | |
| 6,577,613 B1 | 6/2003 | Ramanathan | |
| 6,850,489 B1 | 2/2005 | Omi et al. | |
| 6,871,295 B2 | 3/2005 | Ulrich et al. | |
| 6,963,996 B2 | 11/2005 | Coughlin | |
| 7,076,555 B1 | 7/2006 | Orman et al. | |
| 7,113,993 B1 * | 9/2006 | Cappiello et al. | 709/227 |
| 7,115,919 B2 | 10/2006 | Kodama | |
| 7,139,933 B2 | 11/2006 | Hsu et al. | |
| 7,171,491 B1 | 1/2007 | O'Toole et al. | |
| 7,180,875 B1 | 2/2007 | Neumiller et al. | |
| 7,184,958 B2 | 2/2007 | Kagoshima et al. | |
| 7,231,475 B1 | 6/2007 | Singla et al. | |
| 7,240,358 B2 * | 7/2007 | Horn et al. | 725/87 |
| 7,342,876 B2 | 3/2008 | Bellur et al. | |
| 7,383,288 B2 | 6/2008 | Miloushev et al. | |
| 7,433,332 B2 | 10/2008 | Golden et al. | |
| 7,437,407 B2 | 10/2008 | Vahalia et al. | |
| 7,577,817 B2 | 8/2009 | Karpoff et al. | |
| 7,610,348 B2 | 10/2009 | Kisley et al. | |
| 7,657,581 B2 | 2/2010 | Orenstein et al. | |
| 7,725,437 B2 | 5/2010 | Kirshenbaum et al. | |
| 7,756,826 B2 | 7/2010 | Bots et al. | |
| 7,769,843 B2 | 8/2010 | Neuse et al. | |
| 7,774,469 B2 | 8/2010 | Massa et al. | |
| 7,801,994 B2 | 9/2010 | Kudo | |
| 7,805,580 B2 | 9/2010 | Hirzel et al. | |
| 8,010,829 B1 | 8/2011 | Chatterjee et al. | |
| 8,074,107 B2 | 12/2011 | Sivasubramanian et al. | |
| 8,160,063 B2 | 4/2012 | Maltz et al. | |
| 8,181,061 B2 | 5/2012 | Nightingale et al. | |
| 8,234,518 B2 | 7/2012 | Hansen | |
| 8,261,033 B1 | 9/2012 | Slik et al. | |
| 2002/0152293 A1 | 10/2002 | Hahn et al. | |
| 2004/0153479 A1 | 8/2004 | Mikesell et al. | |
| 2005/0075911 A1 | 4/2005 | Craven | |
| 2005/0078655 A1 | 4/2005 | Tiller et al. | |
| 2005/0094640 A1 | 5/2005 | Howe | |
| 2005/0262097 A1 | 11/2005 | Sim-Tang et al. | |
| 2006/0004759 A1 | 1/2006 | Borthakur et al. | |
| 2006/0015495 A1 | 1/2006 | Keating et al. | |
| 2006/0074946 A1 | 4/2006 | Pham | |
| 2006/0098572 A1 | 5/2006 | Zhang et al. | |
| 2006/0129614 A1 | 6/2006 | Kim et al. | |
| 2006/0280168 A1 | 12/2006 | Ozaki | |
| 2007/0025381 A1 | 2/2007 | Feng et al. | |
| 2007/0156842 A1 | 7/2007 | Vermeulen et al. | |
| 2008/0005275 A1 | 1/2008 | Overton et al. | |
| 2008/0010400 A1 | 1/2008 | Moon | |
| 2008/0098392 A1 | 4/2008 | Wipfel et al. | |
| 2009/0006888 A1 | 1/2009 | Bernhard et al. | |
| 2009/0106269 A1 | 4/2009 | Zuckerman et al. | |
| 2009/0112921 A1 | 4/2009 | Oliveira et al. | |
| 2009/0113323 A1 | 4/2009 | Zhao et al. | |
| 2009/0183002 A1 | 7/2009 | Rohrer et al. | |
| 2009/0204405 A1 | 8/2009 | Kato et al. | |
| 2009/0259665 A1 | 10/2009 | Howe et al. | |
| 2009/0265218 A1 | 10/2009 | Amini et al. | |
| 2009/0268611 A1 | 10/2009 | Persson et al. | |
| 2009/0300407 A1 | 12/2009 | Kamath et al. | |
| 2009/0307329 A1 | 12/2009 | Olston et al. | |
| 2010/0008230 A1 | 1/2010 | Khandekar et al. | |
| 2010/0008347 A1 | 1/2010 | Qin et al. | |
| 2010/0094955 A1 | 4/2010 | Zuckerman et al. | |
| 2010/0094956 A1 | 4/2010 | Zuckerman et al. | |
| 2010/0161657 A1 | 6/2010 | Cha et al. | |
| 2010/0191919 A1 | 7/2010 | Bernstein et al. | |
| 2010/0198888 A1 | 8/2010 | Blomstedt et al. | |
| 2010/0198972 A1 | 8/2010 | Umbehocker | |
| 2010/0250746 A1 | 9/2010 | Murase | |
| 2010/0332818 A1 | 12/2010 | Prahlad et al. | |
| 2011/0022574 A1 | 1/2011 | Hansen | |
| 2011/0153835 A1 | 6/2011 | Rimac et al. | |
| 2011/0246471 A1 | 10/2011 | Rakib | |
| 2011/0246735 A1 | 10/2011 | Bryant et al. | |
| 2011/0258290 A1 | 10/2011 | Nightingale et al. | |
| 2011/0258297 A1 | 10/2011 | Nightingale et al. | |
| 2011/0258482 A1 | 10/2011 | Nightingale et al. | |
| 2011/0258488 A1 * | 10/2011 | Nightingale et al. | 714/15 |
| 2011/0296025 A1 | 12/2011 | Lieblich et al. | |
| 2011/0307886 A1 | 12/2011 | Thanga et al. | |
| 2012/0041976 A1 | 2/2012 | Annapragada | |
| 2012/0042162 A1 | 2/2012 | Anglin et al. | |
| 2012/0047239 A1 | 2/2012 | Donahue et al. | |
| 2012/0054556 A1 | 3/2012 | Grube et al. | |
| 2012/0197958 A1 | 8/2012 | Nightingale et al. | |

OTHER PUBLICATIONS

Kennedy, "Is Parallel Computing Dead", retrieved on Oct. 2, 2012, at http://www.crpc.rice.edu/newsletters/oct94/director.html., Parallel Computing Newsletter, vol. 2, Issue 4, Oct. 1994, 2 pages.

Office action for U.S. Appl. No. 13/112,978, mailed on Dec. 14, 2012, Elson et al., "Data Layout for Recovery and Durability", 15 pages.

Office action for U.S. Appl. No. 13/017,193, mailed on Dec. 3, 2012, Nightingale et al., "Parallel Serialization of Request Processing", 19 pages.

The PCT Search Report and Written Opinion mailed Oct. 23, 2012 for PCT application No. PCT/US2012/035700, 10 pages.

U.S. Appl. No. 12/410,697, "Data Center Without Structural Bottlenecks," Maltz et al, filed Mar. 25, 2009.

U.S. Appl. No. 12/410,745, "Data Center Interconnect and Traffic Engineering," Maltz et al, filed Mar. 25, 2009.

U.S. Appl. No. 12/578,608, "Agile Data Center Network Architecture," Greenberg et al, filed Oct. 14, 2009.

Akturk, "Asynchronous Replication of Metadata Across Multi-Master Servers in Distributed Data Storage Systems", A Thesis Submitted to Louisiana State University and Agricultural and Mechanical College, Dec. 2009, 70 pages.

Bafna et al, "CHIRAYU: A Highly Available Metadata Server for Object Based Storage Cluster File System," retrieved from http://abhinaykampasi.tripod.com/TechDocs/ChirayuPaper.pdf, IEEE Bombay Section, Year 2003 Prof K Shankar Student Paper & Project Contest, Apr. 2003, 6 pgs.

Buddhikot et al, "Design of a Large Scale Multimedia Storage Server," Journal Computer Networks and ISDN Systems, vol. 27, Issue 3, Dec. 1994, pp. 1-18.

Chen et al, "Replication-Based Highly Available Metadata Management for Cluster File Systems," 2010 IEEE International Conference on Cluster Computing, Sep. 2010, pp. 292-301.

"Citrix Storage Delivery Services Adapter for NetApp Data ONTAP", retrieved on Mar. 9, 2010 at <<http://citrix.com/site/resources/dynamic/partnerDocs/datasheet_adapter.pdf>>, Citrix Systems, Citrix Storage Delivery Services Data sheet, 2008, 2 pgs.

"EMC RecoverPoint Family: Cost-effective local and remote data protection and disaster recovery solution", retrieved on Mar. 9, 2010 at <<http://www.emc.com/collateral/software/data-sheet/h2769-emc-recoverpoint-family.pdf>>, EMC Corporation, Data Sheet H2769.8, 2010, 3 pgs.

Fan et al, "A Failure Recovery Mechanism for Distributed Metadata Servers in DCFS2," Seventh International Conference on High Performance Computing and Grid in Asia Pacific Region, Jul. 20-22, 2004, 7 pgs.

Fu, et al., "A Novel Dynamic Metadata Management Scheme for Large Distributed Storage Systems", Proceedings of the 2008 10th IEEE International Conference on High Performance Computing and Communications, Sep. 2008, pp. 987-992.

Fullmer et al, "Solutions to Hidden Terminal Problems in Wireless Networks," Proceedings of the ACM SIGCOMM '97 Conference on Applications, Technologies, Architectures, and Protocols for Computer Communication, Cannes, France, Oct. 1997, pp. 39-49.

Lang, "Parallel Virtual File System, Version 2", retrieved on Nov. 12, 2010 from <<http://www.pvfs.org/cvs/pvfs-2-7-branch.build/doc/pvfs2-guide/pvfs2-guide.php>>, Sep. 2003, 39 pages.

Mohamed et al, "Extensible Communication Architecture for Grid Nodes," abstract retrieved on Apr. 23, 2010 at <<http://www.computer.org/portal/web/csdl/doi/10.1109/itcc.2004.1286587>>, International Conference on Information Technology: Coding and Computing (ITCC'04), vol. 2, Apr. 5-7, 2004, Las Vegas, NV, 1 pg.

Office Action for U.S. Appl. No. 12/766,726, mailed on May 29, 2012, Nightingale et al., "Bandwidth-Proportioned Datacenters", 21 pages.

Office Action for U.S. Appl. No. 12/763,107, mailed on Jul. 20, 2012, Nightingale et al., "Locator Table and Client Library for Datacenters", 11 pages.

Non-Final Office Action for U.S. Appl. No. 12/763,133, mailed on Sep. 16, 2011, Edmund Nightingale, "Memory Management and Recovery for Datacenters", 18 pages.

Sinnamohideen et al, "A Transparently-Scalable Metadata Service for the Ursa Minor Storage System," USENIXATC'10 Proceedings of the 2010 USENIX Conference, Jun. 2010, 14 pgs.

Weil et al, "CRUSH: Controlled, Scalable, Decentralized Placement of Replicated Data," Proceedings of SC '06, Nov. 2006, 12 pgs.

Weiser, "Some Computer Science Issues in Ubiquitous Computing," retrieved at <<https://www.cs.ucsb.edu/~ravenben/papers/coreos/Wei93.pdf>>, Mar. 1993, 14 pgs.

Office action for U.S. Appl. No. 13/116,270, mailed on Feb. 15, 2013, Nightingale et al., "Server Failure Recovery", 16 pages.

Rhea et al., "Maintenance-Free Global Data Storage", IEEE Internet Computing, Sep. and Oct. 2001, 10 pages.

* cited by examiner

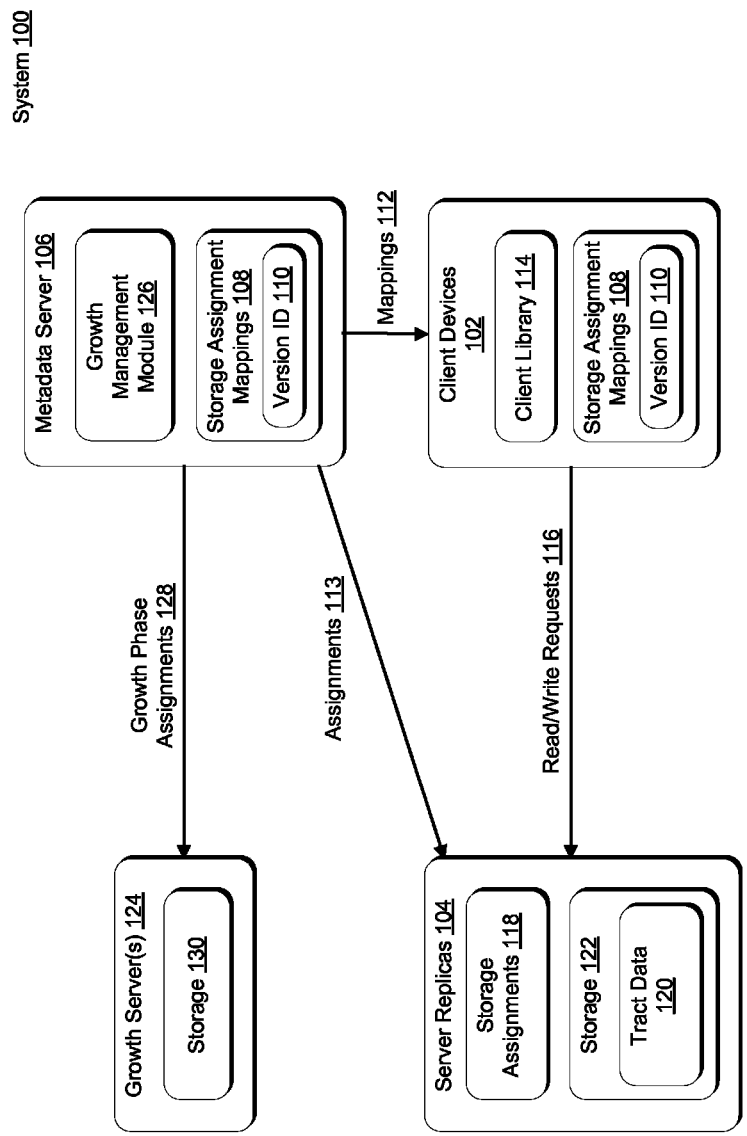

| Storage Indices 202 | Growth Server 124 | Server Replica 104 | Server Replica 104 | Server Replica 104 |
|---|---|---|---|---|
| 000 | D | P | Q | S |
| 001 |   | P | R | Q |
| 010 |   | P | S | R |
| 011 |   | Q | R | S |
| 100 | D | Q | S | R |
| 101 |   | R | S | P |

Storage Assignment Mappings 108

FIG. 2A

Storage Assignment Mappings 108

| | Server Replica 104 | Server Replica 104 | Server Replica 104 | Growth Server 124 |
|---|---|---|---|---|
| 000 | P | Q | S | D |
| 001 | P | R | Q | |
| 010 | P | S | R | |
| 011 | Q | R | S | |
| 100 | Q | S | R | D |
| 101 | R | S | P | |

Growth Server Tags 208

Storage Assignment Mappings 108

FIG. 2D

|  | Server Replica 104 | Server Replica 104 | Server Replica 104 | Growth Server 124 | Growth Server 124 |
|---|---|---|---|---|---|
| 000 | P | Q | S | D |  |
| 001 | P | R | Q |  |  |
| 010 | P | S | R |  | E |
| 011 | Q | R | S |  |  |
| 100 | Q | S | R | D |  |
| 101 | R | S | P |  |  |

Storage Assignment Mappings 108

FIG. 2E

| Storage Indices 202 | Server Replica 104 | Server Replica 104 | Server Replica 104 |
|---|---|---|---|
| 000 | D | Q | S |
| 001 | P | R | Q |
| 010 | P | S | R |
| 011 | Q | R | S |
| 100 | D | S | R |
| 101 | R | S | P |

Storage Assignment Mappings 108

FIG. 2F

READING AND WRITING DURING CLUSTER GROWTH PHASE

RELATED APPLICATIONS

This U.S. Patent Application is a continuation-in-part patent application of co-pending prior application Ser. No. 12/763,107, entitled "Locator Table and Client Library for Datacenters," and of co-pending prior application Ser. No. 12/763,133, entitled "Memory Management and Recovery for Datacenters." Both co-pending prior applications were filed on Apr. 19, 2010. This U.S. Patent Application is also a continuation-in-part patent application of co-pending prior application Ser. No. 13/017,193, entitled "Parallel Serialization of Request Processing" and filed on Jan. 31, 2011. This U.S. Patent Application is further a continuation-in-part patent application of co-pending prior application Ser. No. 13/096,194, entitled "Effective Circuits in Packet-Switched Networks" and filed on Apr. 28, 2011. This U.S. Patent Application is also a continuation-in-part patent application of co-pending prior application Ser. No. 13/112,978, entitled "Data Layout for Recovery and Durability" and filed on May 20, 2011. This U.S. Patent Application is also a continuation-in-part patent application of co-pending prior application Ser. No. 13/116,270, entitled "Server Failure Recovery" and filed on May 26, 2011. U.S. application Ser. Nos. 12/763,107, 12/763,133, 13/017,193, 13/096,194, 13/112,978, and 13/116,270 are hereby incorporated by reference in their entirety herein.

BACKGROUND

Distributed data storage systems, such as those used in cloud computing environments, typically store any given data item in a plurality of locations to ensure data durability. These locations comprise disks stored on server replicas of the distributed data storage systems and are typically mapped to the data items using some form of storage assignment mappings, such as a table. Such storage assignment mappings often associate a specific number of disks with each data item (e.g., three disks mapped to a data item).

To increase overall throughput of the system, it is often desirable to add to the system to increase the total number of disks involved in read and write operations. Adding disks typically involves redistributing data items among the existing and new disks of the system. One technique for redistributing data items involves selecting a set of data items to be stored on a new disk and associating the new disk with those data items in the storage assignment mappings. The storage assignment mappings are then updated to remove a disk previously assigned to each data item and replace that disk in the storage assignment mappings with the new disk. Because each data item associated with the new disk may be associated with a different set of disks, the new disk may only replace the removed disks with respect to one or more data items. The "removed" disks may remain part of the system and the storage assignment mappings with respect to other data items. Upon accepting their storage assignments, the new disks retrieve the data items from the other disks storing those data items.

One issue with this technique is that it results in a temporary decrease in data durability. In the time it takes for the new disk to retrieve and store the data items associated with it, the system is under-replicated with respect to those data items. This decrease in data durability may increase data loss or the cost of data recovery in the event of disk failures.

SUMMARY

A distributed data storage system described herein includes client devices configured to read and write from server replicas of the system. The system enters a growth phase when a new server replica is added to the system, replacing a server replica with respect to a storage index. During the growth phase, client devices writing data associated with the storage index write to both the current set of server replicas and the new server replica. Also during the growth phase, the client devices read data associated with the storage index from the current set of server replicas, but not from the new server replica. The client devices determine if the system is in a growth phase with respect to the storage index by referencing storage assignment mappings associating the storage index with the current set of server replicas. The storage assignment mappings may indicate in some manner that the storage index is in a growth phase or may include a growth data structure that includes a representation of the new server replica.

The storage assignment mappings are generated and updated by a metadata server of the system and provided to the client devices responsive to requests from client devices for a current version of the storage assignment mappings. The metadata server initiates the growth phase by updating the storage assignment mappings and instructing the new server replica to retrieve data associated with the storage index from the current set of server replicas. The metadata server again updates the storage assignment mappings upon receiving an indication from the new server replica that it has completed retrieving the data. In this update, the metadata server replaces one server replica of the current set of server replicas with the new server replica, thus completing the growth phase.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

FIGS. 1A-1C illustrate client devices, a metadata server, server replicas, and growth server(s) of a system before, during, and after a growth phase in which the growth server(s) replace server replica(s) with respect to one or more storage indices, in accordance with various embodiments.

FIGS. 2A-2F illustrate examples of storage assignment mappings generated by a metadata server and provided to client devices, in accordance with various embodiments.

DETAILED DESCRIPTION

Figure 1B:
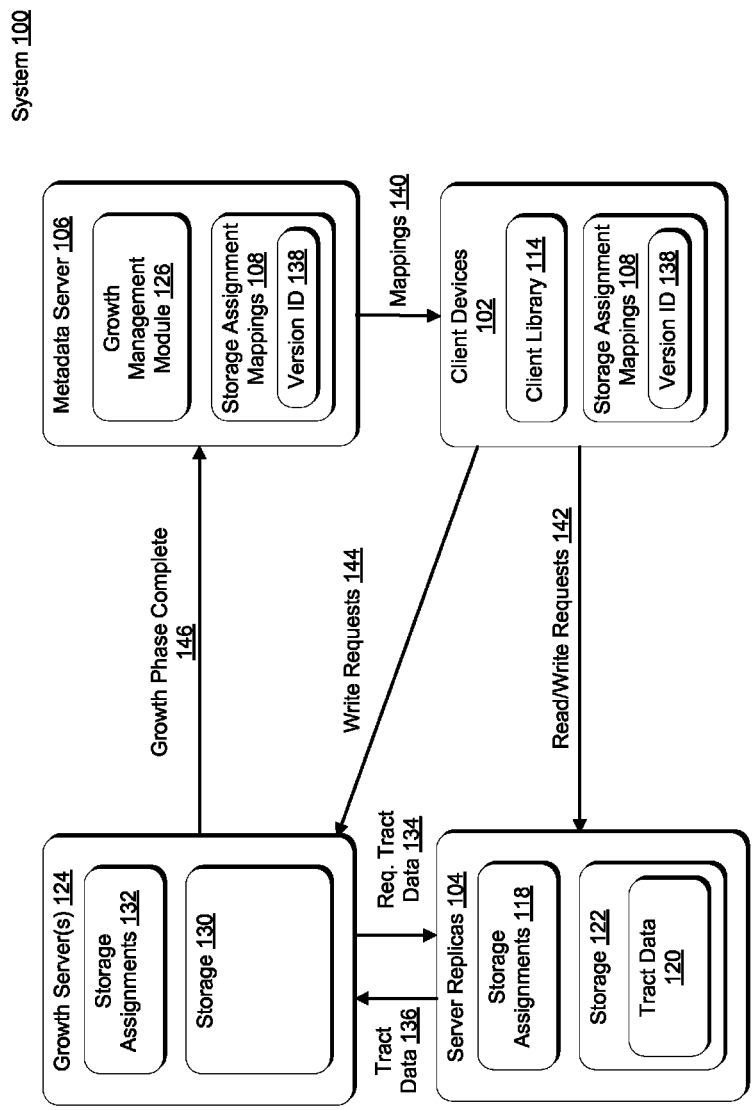

Described herein are techniques for writing to and reading from server replicas of a distributed data storage system during a cluster growth phase. Client devices of the system determine that the system is in a growth phase with respect to a storage index associated with data items that the client devices are writing or reading. In response to determining that the system is in a growth phase with respect to the storage index, the client devices write data items associated with the storage index to both the current set of server replicas associated with the storage index (also referred to herein as "the set of server replicas" or "live server replicas") and one or more new server replicas designated to replace one or more server replicas of the current set of server replicas. These one or more new server replicas are also referred to herein as "growth servers." Also during the growth phase, the client devices read the data items associated with the storage index from the current set of server replicas, but not from the one or more new server replicas. Upon completion of the growth phase, the client devices read to and write from an updated set of server replicas associated with the storage index. This updated set of server replicas includes the one or more new server replicas and omits the one or more server replicas replaced by the new server replicas.

In various embodiments, the client devices determine that the system is in a growth phase with respect to a storage index by utilizing storage assignment mappings received from a metadata server of the system. The storage assignment mappings comprise system metadata, including storage indices associated with one of rows or columns and server replicas associated with the other of the rows or columns. Each storage index is associated with a set of server replicas and is representative of one or more data items stored by that set of server replicas. The storage assignment mappings, then, allow client devices to determine which server replicas store which data items. The storage assignment mappings may also include growth indicators associated with storage indices or with a column/row of server replicas. These growth indicators inform client devices that specific storage indices are in a growth phase or that the specific column/row of server replicas includes new server replicas. In other embodiments, the storage assignment mappings include a growth data structure that associates storage indices with new server replicas. The client devices may check the growth data structure to determine whether a storage index is associated with any new server replicas in the growth data structure. If it is, then the client devices determine that the system is in a growth phase with respect to that storage index.

In some embodiments, the metadata server of the system initiates the growth phase with respect to a storage index by updating the storage assignment mappings and instructing the new server replicas to retrieve data items associated with the storage indices assigned to them. The updated storage assignment mappings include the above-described growth indicators or growth data structure. The metadata server provides the updated storage assignment mappings to the client devices while the new server replicas retrieve the data items, enabling the client devices to operate during the growth phase in the manner described above. Once the new server replicas complete the retrieval of the data items, they provide the metadata server with indications that they have completed the growth phase. Responsive to receiving the indications, the metadata server updates the storage assignment mappings, replacing the server replicas that were designated to be replaced with the new server replicas. These storage assignment mappings are then provided to requesting client devices.

As mentioned, each storage index of the storage assignment mappings is representative of one or more data items. These data items may be of any type, size, or grouping. In some embodiments, data items may be stored as units of data called "tracts." Tracts have a predetermined same or similar size, such as one megabyte, and represent the smallest unit of data that can be read from or written to a storage unit that maximizes performance. For example, on a mechanical device, such as a disk, the tract size would be large enough to amortize the cost of the disk's seek and/or rotational delay when reading in data. As a second example, on a medium such as flash, the tract size would be calculated based on the chip bandwidth and characteristics of the flash storage medium. Each tract belongs to a byte sequence, each byte sequence being comprised of multiple tracts distributed across multiple servers of the system to enable more efficient reading from and writing to the tracts. In such embodiments, the storage assignment mappings may be tract storage assignment mappings, such as "tract locator tables" that may be used by client devices for reading from and writing to tracts, as well as for identifying server replicas storing metadata for byte sequences. Also, in such embodiments, the storage indices may be prefixes taken from fixed length translations, such as hashes, of tract identifiers. Alternatively, the storage indices may be the remainders of mod operations that divide one of the prefixes, the hashes, or the tract identifiers for tracts by the number of storage indices used in the tract locator table.

Tracts, byte sequences, tract locator tables, and their uses are described in greater detail in U.S. patent application Ser. No. 12/763,107, entitled "Locator Table and Client Library for Datacenters" and filed on Apr. 19, 2010, U.S. patent application Ser. No. 12/763,133, entitled "Memory Management and Recovery for Datacenters" and filed on Apr. 19, 2010, U.S. patent application Ser. No. 13/017,193, entitled "Parallel Serialization of Request Processing" and filed on Jan. 31, 2011, U.S. patent application Ser. No. 13/096,194, entitled "Effective Circuits in Packet-Switched Networks" and filed on Apr. 28, 2011, U.S. patent application Ser. No. 13/112,978, entitled "Data Layout for Recovery and Durability" and filed on May 20, 2011, and U.S. patent application Ser. No. 13/116,270, entitled "Server Failure Recovery" and filed on May 26, 2011. These applications are incorporated herein by reference above in "Related Applications."

The figures below illustrate examples in which the storage assignment mappings are a tract locator table and the data items are tracts, it is to be understood that the techniques described herein are in no way limited to tracts and tract locator tables.

Example Environment

Figure 1C:
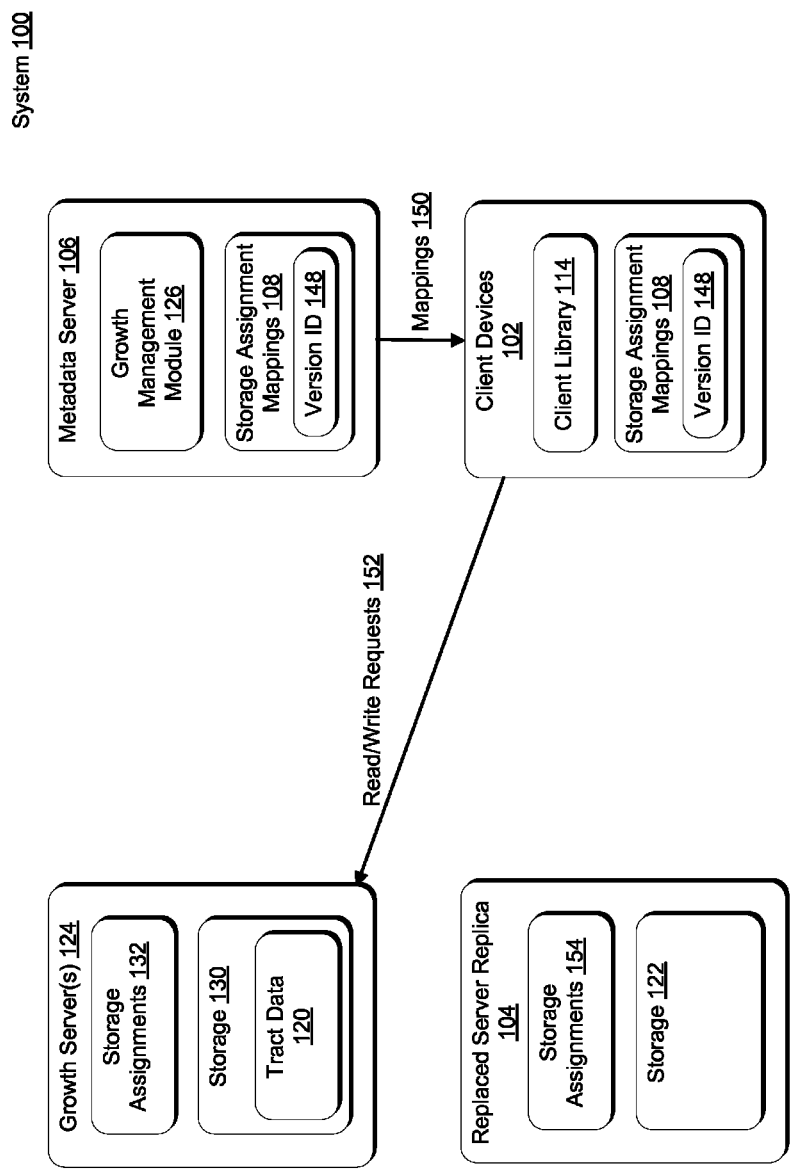

FIGS. 1A-1C illustrate client devices, a metadata server, server replicas, and growth server(s) of a system before, during, and after a growth phase in which the growth server(s)

replace server replica(s) with respect to one or more storage indices, in accordance with various embodiments. As illustrated in FIG. 1A, a system 100 includes client devices 102, server replicas 104, and a metadata server 106. The client devices 102 and metadata server 106 each include storage assignment mapping 108 identified by version identifiers 110. These storage assignment mappings 108, or a subset thereof, are provided 112 by the metadata server 106 to the client devices 102. Storage assignments from the storage assignment mappings 108 are provided 113 by the metadata server 106 to the server replicas 104. For example, the metadata server 106 may provide 113 the storage assignments to each server replicas that are associated with that server replica 104. Client libraries 114 of the client devices 102 utilize the storage assignment mappings 108 to make read and write requests 116 of the server replicas 104. These read and write requests 116 are associated with storage indices that match storage assignments 118 of the server replicas 104, the storage indices representing tract data 120 that is stored on storage 122 of the server replicas 104. As is further shown in FIG. 1A, the system also includes a growth server 124 designated to replace one of the server replicas 104. The metadata server 106 manages a growth phase associated with the growth server 124 using a growth management module 126 that is configured to manage the growth phase. The growth management module 126 may initiate the growth phase by providing growth storage assignments 128 to the growth server 124. The growth server 124 may indicate acceptance of the growth storage assignments 128, the and growth management module 126 of the metadata server 106 may then instruct the growth server 124 to retrieve tract data 120 and store the tract data 120 in storage 130 of the growth server 124.

FIG. 1B illustrates a number of operations of devices of the system 100 during the growth phase. As shown in FIG. 1B, the growth server 124 includes storage assignments 132 corresponding to the growth storage assignments 128. Upon accepting these storage assignments 132 and receiving instruction from the metadata server 106 to retrieve tract data 120 associated with the storage assignments 132, the growth server 124 requests 134 the tract data 120 from the server replicas 104 that are storing the tract data 120 and, in response, receives 136 the tract data 120. As is further shown in FIG. 1B, while the growth server 124 is retrieving the tract data 120, the growth management module 126 of the metadata server 106 updates the storage assignment mappings 108 to indicates the growth phase and identify the growth server 124. When updating the storage assignment mappings 108, the growth management module 126 also updates the version identifier 110 to a new version identifier 138 by, e.g., incrementing the version identifier 110 to generate version identifier 138. The growth management module 126 then provides 140 the updated storage assignment mappings 108 to the client devices 102, possibly in response to client device requests for the updated storage assignment mappings 108. Based on the updated storage assignment mappings 108, the client devices 102 make read and write requests 142 to the server replicas 104 and make those same write requests 142 as write requests 144 of the growth server 124. The growth phase then terminates when the growth server 124 has retrieved the tract data 120 and indicates 146 to the metadata server 106 that the growth phase is complete.

FIG. 1C illustrates a number of operations of devices of the system 100 following the growth phase. As shown in FIG. 1C, following the growth phase, the growth management module 126 of the metadata server 106 updates the storage assignment mappings 108 to replace the server replica 104 designated to be replaced with the growth server 124. When updating the storage assignment mappings 108, the growth management module 126 also updates the version identifier 138 to a new version identifier 148 by, e.g., incrementing the version identifier 138 to generate version identifier 148. The growth management module 126 then provides 150 the updated storage assignment mappings 108 to the client devices 102, possibly in response to client device requests for the updated storage assignment mappings 108. Based on the updated storage assignment mappings, the client devices 102 make read and write requests 152 of the growth server 124 and the remaining server replicas 104, but not of the replaced server replica 104. The replaced server replica 104 received updated storage assignments 154, which do not include the storage index associated with the tract data 120.

Figure 6:
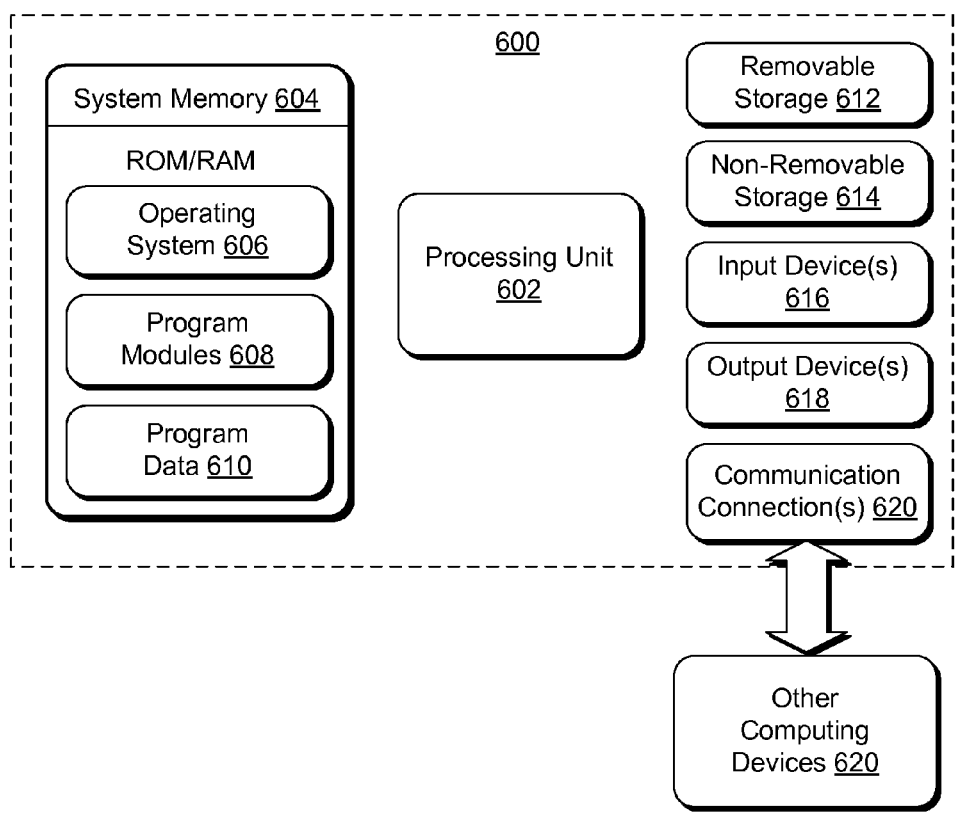
FIG. 6 illustrates a block diagram showing an example system architecture for a computer system such as a metadata server, a client device, or a server replica/growth server, in accordance with various embodiments.

In various embodiments, the client devices 102, server replicas 104, metadata server 106, and growth server 124 may each be any sort of computing device or computing devices. For example, the client devices 102, server replicas 104, metadata server 106, and growth server 124 may each be or include a personal computer (PC), a laptop computer, a server or server farm, a mainframe, a work station, an embedded device (e.g., a disk with an attached Ethernet port), or any other sort of device or devices. In one implementation, the client devices 102, server replicas 104, metadata server 106, and growth server 124 represent a plurality of computing devices working in communication, such as a cloud computing network of nodes. When implemented on multiple computing devices, the client devices 102, server replicas 104, metadata server 106, and growth server 124 may distribute the modules and data of the client devices 102, server replicas 104, metadata server 106, and growth server 124 among the multiple computing devices. In some implementations, a client device 102, a server replica 104, the metadata server 106, or the growth server 124 represents one or more virtual machines implemented on one or more computing devices. The nature and functions of the modules and data of the client devices 102, server replicas 104, metadata server 106, and growth server 124 are described further herein. An example client device 102, server replica 104, metadata server 106, or growth server 124 is illustrated in FIG. 6 and is described below in greater detail with reference to that figure.

As mentioned above, the growth server 124 is a new server replica that, upon completion of the growth phase, servers as a server replica 104. Accordingly, the term "growth server" refers to the fact that a server replica is a new server replica being used to replace a current server replica 104 with respect to a storage index. Otherwise, the growth server 124 may include the same logical and hardware components as any of the server replicas 104.

In some embodiments, a network or networks may connect the client devices 102, server replicas 104, metadata server 106, and growth server 124. The network or networks may be any type of networks, such as wide area networks (WANs), local area networks (LANs), or the Internet. Also, the network or networks may be public, private, or include both public and private networks. Further, the network or networks may be wired, wireless, or include both wired and wireless networks. The network or networks may utilize any one or more protocols for communication, such as the Internet Protocol (IP), other packet based protocols, or other protocols. Additionally, the network or networks may comprise any number of intermediary devices, such as routers, base stations, access points, firewalls, or gateway devices.

In various embodiments, the storage assignment mappings 108 may be any sort of data structure or data structures of any program or programs. For example, the storage assignment mappings 108 may be a metadata table that includes rows corresponding to storage indices and columns corresponding to server replicas 104. Each storage index corresponds to one or more data items, such as to a set of tract data 120. The server replicas 104 associated with that storage index are the server replicas 108 storing or designated to store the one or more data items. Each intersection of a row and column, then, represents a server replica 104 designated to store or storing one or more data items corresponding to a storage index. In addition to rows and columns, the storage assignment mappings 108 also includes a version identifier 110 identifying the current version of the storage assignment mappings 108. The version identifier 110 may be a number or any other sort of value capable of serving as an identifier. In other embodiments, the rows and columns may be reversed, with columns corresponding to storage indices and rows to server replicas 104. In yet other embodiments, the storage assignment mappings 108 may be a namespace rather than a metadata table. Also, as mentioned above, the storage assignment mappings may include growth indicators or a growth data structure to indicate a growth server 124 associated with a storage index. Example storage assignment mappings are illustrated in FIGS. 2A-2F and are discussed further below with reference to those figures.

In various embodiments, prior to the growth phase, the metadata server first provides 113 storage assignments 118 to server replicas 104. These storage assignments 118 inform the server replicas 104 of the storage indices that they will store tract data 120 for. The server replicas 104 may then indicate to the metadata server that they accept the storage assignments 118, and the metadata server 106 will generates or updates storage assignment mappings 108 to reflect the current storage assignments 118. The metadata server 106 may also set or increment the version identifier 110. In some embodiments, the metadata server 106 generates the storage assignment mappings based on rules and/or parameters.

After generating/updating the storage assignment mappings, the metadata server 106 provides 112 the storage assignment mappings 108 to the client devices 102. The metadata server 106 may provide 112 the storage assignment mappings 108 on its own initiative or in response to a client device request for storage assignment mappings 108. The client devices 102 store the storage assignment mappings 108.

In various embodiments, the client libraries 114 of the client devices 102 utilize the received storage assignment mappings 108 perform operations relating to data items and sets of data items, such as the above described tracts and byte sequences. The client libraries 114 determine or receive identifiers of byte sequences or tracts and use those identifiers to generate one or more storage indices. Upon generating the storage indices, the client libraries 114 looks up the server replicas 104 associated with that storage indices in the storage assignment mappings 108.

In some embodiments, the client libraries 114 may receive requests from applications to read from or write to a byte sequence or specific tracts of a byte sequence. Using identifiers associated with the tracts and the storage assignment mappings 108, the client libraries 114 determine the server replicas 108 storing the tract data 120 for those tracts. Once server replicas 104 storing or designated to store all tracts to be read from or written to are identified, the client libraries 114 make read or write requests 116 to the server replicas 104. Requests 116 may be made in parallel of the identified server replicas 104 or may be made to one or a subset of the server replicas 104, which then relay the requests 116 to the other server replicas 104.

In various embodiments, the byte sequence associated with the request may use only a subset of available server replicas 104 for storage. For example, if the byte sequence is a temporary file that is likely to be read from or written to a minimal number of times, data durability is likely not as much a concern, and a smaller number of server replicas 104 may be used. In such embodiments, the client libraries 114 first request metadata associated with the byte sequence and use the metadata to determine a number of replicas used for that byte sequence. For instance, the storage assignment mappings 108 may make three replicas available for each storage index, but the example byte sequence may utilize only a single replica. The client libraries 114 may then use the number of server replicas obtained from the metadata when referencing the storage assignment mapping, returning only an identifier of a single server replica 104 associated with a storage index. This returned identifier may be from the first column/row or from a consistently used $n^{th}$ column/row. The client libraries 114 may then read from or write to that server replica 104.

In some embodiments, a server replica 104 may indicate in its response to a client device 102 that the storage assignment mappings 108 being used by that client device 102 are out-of-date. The server replica 104 may determine this by comparing the current version 110 of the storage assignment mappings 108 to version information included in the request 116 which indicates the version of the storage assignment mappings 108 being used by the client device 102. Based on such a response, the client device 102 requests updated storage assignment mappings 108 from the metadata server 106. The client 106 may also request updated storage assignment mappings 108 based on the failure of a server replica 104 to respond in a given time period.

In various embodiments, server replicas 104 utilize the storage assignments 118 to determine which storage indices they are associated with. The server replicas 104 may use the storage assignments 118 to validate requests 116, ensuring that they are the appropriate server replicas 104 for the requests 116 and providing negative responses if they are not the appropriate server replicas 104. In some embodiments, server replicas 104 also store tract data 120 from a plurality of byte sequences in their storage 122, the tracts of a given byte sequence being distributed among a plurality of the servers replicas 104. In other embodiments, tract data 120 comprises other types of data of differing sizes.

As mentioned above, a growth management module 126 of the metadata server 106 may initiate a growth phase with respect to one or more storage indices. The growth management module 126 may do so on a periodic or event-driven basis, pulling growth servers 124 from a pool of unused server replicas and selecting storage indices to associate with the growth servers 124 in some manner. For example, the growth management module 126 could determine the server replicas 104 with the greatest number of storage assignments 118, select a storage index associated with each of these server replicas 104—taking care not to select the same storage index more than once—and associate those storage indices with the growth server 124. In other embodiments, the growth management module 126 receives instructions from an operator or another system to initiate a growth phase. These instructions may identify the growth server 124, the storage indices associated with the growth server 124, and the server replicas 104 designated to be replaced with respect to those storage indices.

The growth management module 126 then provides 128 growth phase assignments 132 to the growth server 124, indicating the storage indices that the growth server 124 will be responsible for. The growth server 124 may then inform the metadata server 106 that it accepts the assignments 132, and the growth management module 126, in response to the acceptance updates the storage assignment mappings 108 and instructs the growth server 124 to enter the growth phase and retrieve tract data 120 associated with its assigned storage indices from the server replicas 104 storing that tract data 120. The growth management module 126 may update the storage assignment mappings itself or may request that another module or component of the metadata server 106 update the storage assignment mappings 108.

Updating the storage assignment mappings 108 includes updating the version identifier 110 to a new version identifier 138, conveying that the storage assignment mappings have been updated. In some embodiments, this may involve incrementing the version identifier 110 by some number to arrive at version identifier 138. This updated version identifier 138 may then be conveyed to all server replicas 104 in the system 100. In one embodiment, the metadata server 106 may associate a version identifier with each storage index and, when entering the growth phase for a group of storage indices to be associated with the growth server 124, only increment/update the version identifiers associated with those storage indices and provide the incremented version identifiers to server replicas 104 associated with those storage indices.

Updating the storage assignment mappings 108 further includes setting a growth indicator for a storage index or column/row of server replicas 104 and/or adding the growth server 124 to a growth data structure for the storage indices assigned to the growth server 124. Such growth indicators and growth data structures are described further below with reference to FIGS. 2A-2F.

In various embodiments, after receiving instructions to enter the growth phase and retrieve the tract data 120, the growth server 124 uses the storage assignment mappings 108, or a subset of those mappings 108, to identify server replicas 104 storing the tract data 120. The growth server 124 then contacts those identified server replicas 104, requesting 134 the tract data 120. As the growth server receives 136 the tract data 120, the growth server 124 stores the received tract data 120 in storage 130.

While the growth server 124 is in the growth phase, the growth management module 126 or other component or module of the metadata server 106 provides 140 the updated storage assignment mappings 108 to client devices 102. The growth management module 126 may do this automatically, after instructing the growth server 124 to enter the growth phase, or may do so in response to a client device 102 request for updated storage assignment mappings. For example, the client device 102 may have attempted a read or write request 116 of server replicas 104 and indicated the version identifier of the storage assignment mappings 108 it was using as version identifier 110. The server replicas 104, aware that the current version identifier is version identifier 138, may then inform the client device 102 that it is using an out-of-date version of the storage assignment mappings 108, and the client device 102 may request the updated storage assignment mappings 108 from the metadata server 106.

In various embodiments, upon receiving the updating storage assignment mappings 108, the client devices 102 may utilize the updated storage assignment mappings 108 to perform read and write operations 142/144. The client libraries may identify the server replicas 104 associated with a storage index that is being written to or read from in the manner described above. Additionally, the client libraries 114 may examine the updated storage assignment mappings 108 to determine whether the updated storage assignment mappings 108 include a growth indicator or identification of the growth server 124 in the growth data structure. In one embodiment, the client libraries 114 may determine that the storage index is associated with a growth indicator. Responsive to this determination, the client libraries 114 determine the identity of the growth server 124 by referencing a specific column/row (e.g., the first or second column or row), by determining if fields of one column/row include both identifications of the growth server 124 of other server replica 104 that it is replacing, or by referencing the growth data structure. In another embodiment, the client libraries 114 determine that a column/row associated with server replicas includes a growth indicator and check if that column/row includes an entry associated with the storage index. In a further embodiment, no growth indicator is used, and the client libraries 114 reference the growth data structure to determine if it includes any entries associated with the storage index. While the illustrated embodiments show and discuss only a single growth server 124, it is to be understood that there may be multiple growth servers 124 replacing multiple server replicas 104 for a storage index. Thus, the client libraries may identify multiple growth server 124.

In some embodiments, after identifying the servers replicas 104 and growth server 124, the client libraries 114 transmit read and write requests 142 to the server replicas 104, including to the server replica 104 designated to be replaced, and transmit write requests 144 identical to the write requests 142 to the growth server 124. By reading only from the current server replicas 104, the client libraries 114 avoid any unnecessary read from a growth server 124 that may not have retrieved the tract data 120 being read. By writing to both the current server replicas 104 and the growth server 124, the client libraries 114 maintain the data durability of the system 100 during the growth phase.

In some embodiments, as mentioned above, the client libraries 114 may be writing or reading tract data 120 associated with an under-replicated byte sequence. This under-replicated byte sequence utilizes fewer than the available number of replicas for a storage index (e.g., one of an available three). In such embodiments, it is also possible that the growth data structure includes growth servers 124 that are not designated to replace any of the utilized server replicas 104. For example, the growth server 124 may be designated to replace a second server replica 104, but the byte sequence may only utilize the first server replica 104. Thus, when the byte sequence is under-replicated, the client libraries 114 may determine whether growth servers 124 associated with the storage index are designated to replace any of the utilized server replicas 104. In one embodiment, each growth server identification may be tagged with an identification of the server replica 104 that it is designated to replace. The client libraries 114 may compare this identification included in the tag with the identifications it has made of utilized server replicas. If there is a match, the client libraries send the write requests 114 to the matched growth server. If there is no match, then the client libraries 114 proceed as if the system is not in growth phase with respect to the storage index.

In various embodiments, the growth server 124 completes the retrieval 136 of the tract data 120. In response to completing the retrieving 136, the growth server 124 provides an indication 146 to the metadata server 106 that it has completed retrieving 136 the tract data 120. Upon receiving the indication 146, the growth management module 126 or other component or module of the metadata server 106 again updates the storage assignment mappings 108. This second updating includes replacing the representations of the server replicas 104 designated to be replaced with representations of the growth server 124, making the growth server 124 one of the current server replicas 104 for the storage indices associated with the growth server 124. Replacing may also include resetting the growth indicator to show that growth is not occurring with respect to the storage indices of the growth server 124 and/or removing the representation of the growth server 124 from the growth data structure. Also, in addition to the replacing, the second updating includes updating/incrementing the version identifier 138 to a version identifier 148. This second updating completes the growth phase.

In some embodiments, the metadata server 106 then provides 150 the second updated storage assignment mappings 108 to the client devices 102. These second updated storage assignment mappings 108 may be provided automatically or responsive to client device requests. The client libraries 114 may then utilize the second updated storage assignment mappings 108 to identify the growth server 124 and the not-replaced server replicas 104 and the server replicas to transmit read and write requests 152 to. Because the replaced server replica 104 is no longer associated with the storage index in the second updated storage assignment mappings 108, the client libraries 114 do not transmit read and write requests 152 to the replaced server replica 104. The replaced server replica 104 may still store tract data for other storage indices, and will receive updated storage assignments 154 from the metadata server 106 that omit the storage index for which the server replica 104 was replaced.

Example Storage Assignment Mappings

Figure 2B:
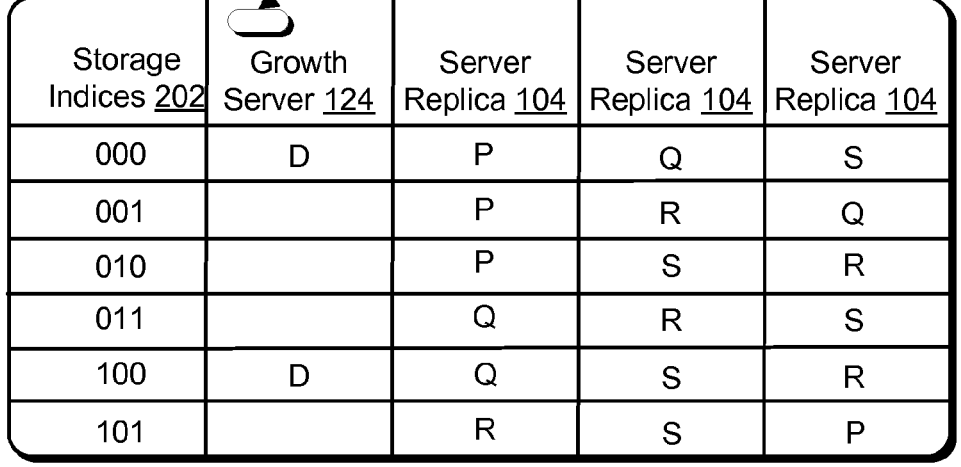

FIGS. 2A-2F illustrate examples of storage assignment mappings generated by a metadata server and provided to client devices, in accordance with various embodiments. As illustrated in FIG. 2A, storage assignment mappings 108 may be a table that includes rows corresponding to storage indices 202, columns of server replicas 104, and a column of growth server(s) 124. In other embodiments, storage indices 202 may correspond to columns and server replicas/growth servers to rows. Each intersection of a column of server replicas 104 and a row associated with a storage index 202 includes a representation of a server replica 104 storing one or more data items associated with that storage index 202. A subset of the intersections of the column associated with growth server(s) 124 and the rows of storage indices 202 include representations of the growth server(s) 124 that have been associated with those storage indices 202. The other intersections of the column associated with growth server(s) 124 and the rows of storage indices 202 include a null value or some other default value. Each storage index 202 associated with a growth server 124 may be further associated with a growth indictor 204, such as a Boolean value or some other kind of value, the growth indicator 204 being represented as metadata or a tag of the storage index 202. As is further illustrated in FIG. 2A, the column of growth server(s) may be the first column or second column to enable accurate reading and writing for under-replicated byte sequences. Also, while FIGS. 2A-2F do not show any representation of a version identifier 110/138/148, it is to be understood that the storage assignment mappings 108 may include a version identifier 110/138/148 as metadata or in some other manner.

FIG. 2B illustrates storage assignment mappings 108 in which the growth indicator 204 is associated with a column of growth server(s), indicating that entries in that column are either representations of growth server(s) that have been assigned to specific storage indices 202 or null or other values for storage indices 202 that have not been associated with growth server(s) 124. By associated the growth indicator 204 with a column, any column of the storage assignment mappings 108 may be designated as a growth server column.

Figure 2C:

In FIG. 2C, no growth indicator 204 is utilized. Instead, the growth server column includes entries for representations of growth server(s) 124 that are tagged with identifiers 206 of the server replicas 104 that they are designated to replace. Thus, a client device 102 may utilize the storage assignment mappings 108 to identify growth server(s) 124 by determining if entries include tags identifying servers that the subjects of the entries are designated to replace. In other embodiments, the column of growth server(s) 124 may be a growth data structure that is included in the storage assignment mappings 108 or separate from the storage assignment mappings 108. In the growth data structure, the entries may also be tagged with identifiers of server replicas 104 that they are designated to replace.

FIG. 2D illustrates representations of server replicas 104 being tagged with identifications of growth server(s) 124 that are designated to replace those server replicas 104. In other embodiments, rather than identifiers, the tags 208 may be used to reference a growth data structure, such as a tree, lookup table, etc. to identify the growth server(s) 124.

FIG. 2E illustrates storage assignment mappings 108 that include multiple columns of growth servers 124. Each of the growth servers 124 may be designated to replace server replicas 104 with respect to one or more storage indices 202, in the manner described above.

FIG. 2F illustrates storage assignment mappings 108 following the completion of the growth phase. In the storage assignment mappings 108 of FIG. 2E, entries previously including representations of server replicas 104 that were designated to be replaced now include representations of the growth server(s) that replaced those server replicas 104.

Example Metadata Server Failure Scenario

Figure 3:
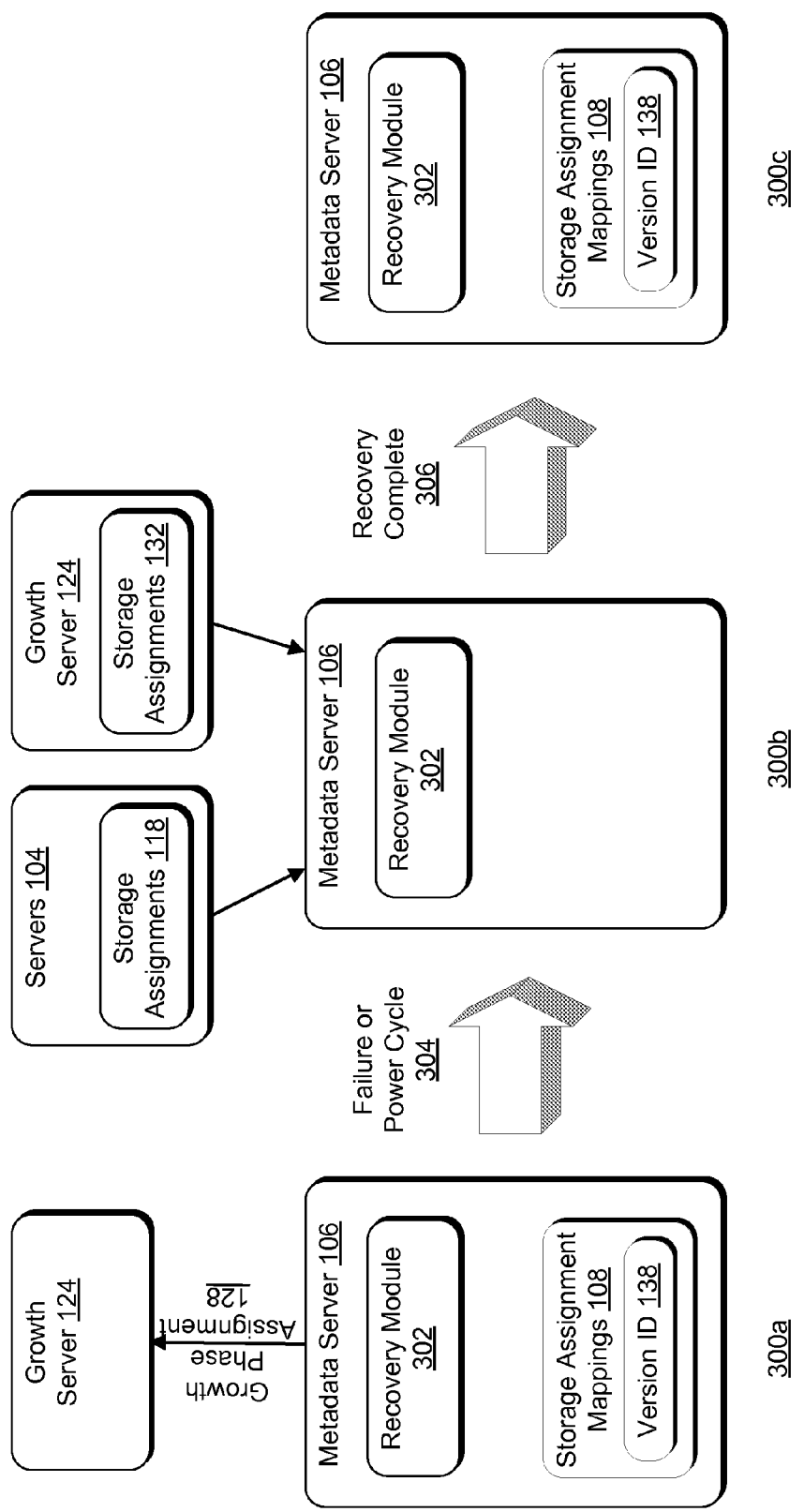
FIG. 3 illustrates a block diagram showing interactions of a metadata server, server replicas, and growth server(s) of a system during a metadata server failure or power cycle and a metadata server recovery process, in accordance with various embodiments.

FIG. 3 illustrates a block diagram showing interactions of a metadata server, server replicas, and growth server(s) of a system during a metadata server failure or power cycle and a metadata server recovery process, in accordance with various embodiments. As illustrated, during time period 300a, the metadata server has initiated the growth phase by providing 128 growth phase assignment to the growth server 124. In order to handle any sort of failures or power cycles that may occur during the growth phase or otherwise, the metadata server 106 includes a recovery module 302 that is capable of reconstructing storage assignment mappings 108. The storage assignment mappings 108 may be stored in non-persistent storage of the metadata server 106 and may be lost during the metadata server failure or power cycle. Recovery of the storage assignment mappings 108 outside the context of growth phase is described in greater detail in the above-cited U.S. patent application Ser. No. 13/116,270, entitled "Server Failure Recovery" and filed on May 26, 2011.

In various embodiments, during an operating phase in time period 300a, the metadata server 106 fails or undergoes a power cycle 304. The failure 304 may have any sort of cause, such as loss of power or failure of a hardware or software component. A power cycle 304 is simply the powering down or rebooting of the metadata server 106, causing non-persistent storage of the metadata server 106 to have its contents flushed. The recovery process of time period 300b begins when the metadata server 106 reboots or is brought back online. If a hardware or software component of the metadata server 106 failed, there may be a substantial time interval between the failure 304 and the beginning of the recovery process during time period 300b. During this time interval, the system 100 is not operational. To avoid this situation, the system 100 may use multiple devices as the metadata server 106, including a primary metadata server and some number of backup metadata servers, such as a secondary metadata server, in place of a single metadata server 106. Only the device serving the role of primary metadata server acts as the metadata server 106 at any given time. The secondary metadata server simply remains in a waiting state, ready to assume the primary metadata server role in case of a failure 304 of the device serving as the primary metadata server. As an alternative to using primary and backup metadata servers, paxos or consensus systems may be used. In such embodiments where multiple devices are used for the metadata server 106, the time interval between the failure 304 and the recovery process of time period 300b may not be substantial.

During the recovery process of time period 300b, the recovery module 302 of the metadata server 106 performs the operations involved in the recovery of the metadata server 106. The recovery module 302 initializes the recovery process automatically when the metadata server 106 boots up or is brought online. Upon initializing the recovery process, the recovery module 302 requests the storage assignments 118 that are stored in persistent storage of the server replicas 104. The recovery module 302 also requests storage assignments 132 from growth server 124 without knowing that the growth server 124 is a growth server 124. In other words, from the perspective of the recovery module 302, the server replicas 104 and growth server 124 are not differentiated. Responsive to the requests, the server replicas 104 provide the storage assignments 118 to the metadata server 106. Also responsive to the requests, the growth server 124 provides the metadata server 106 with the storage assignments 132, an indication that the growth server 124 is in a growth phase, and an indication of which server replicas 104 the growth server 124 is designated to replace with respect to which storage assignments 132. The recovery module 302 then rebuilds the storage assignment mappings 108 from the received storage assignments 118, the received storage assignments 132, the indication of the growth phase, and the designations of serve replicas 104 that are to be replaced, and stores the storage assignment mappings 108 in its non-persistent storage.

In some embodiments, the server replica and growth server responses may include indications of the latest version identifier of the storage assignment mappings 108 known to the server replicas 104 and growth server 124. The recovery module 302 may set the version identifier of the rebuilt storage assignment mappings 108 based on these received version identifiers by, for example, incrementing the version identifier specified in the indications.

Upon completion of rebuilding the storage assignment mappings 108 and storing the rebuilt storage assignment mappings 108 in non-persistent storage, the metadata server 106 provides the rebuilt storage assignment mappings 108 to the client devices 102 upon request. The recovery module 302 then determines that the recovery process is complete 306. If there are portions of the storage assignment mappings 108 without server replicas 108 assigned to them, then the metadata server 106 finds replacement server replicas 104 for the missing portions of the storage assignment mappings 108. Also, if the growth server 124 fails simultaneously with the metadata server 106, the metadata server 106 treats the storage assignments 132 of that failed growth server 124 as if they are not in the growth phase, thus terminating the growth phase with respect to those storage assignments 132 unsuccessfully.

During time period 300c, the system 100 may return to an operating phase.

Example Operations

Figure 4:
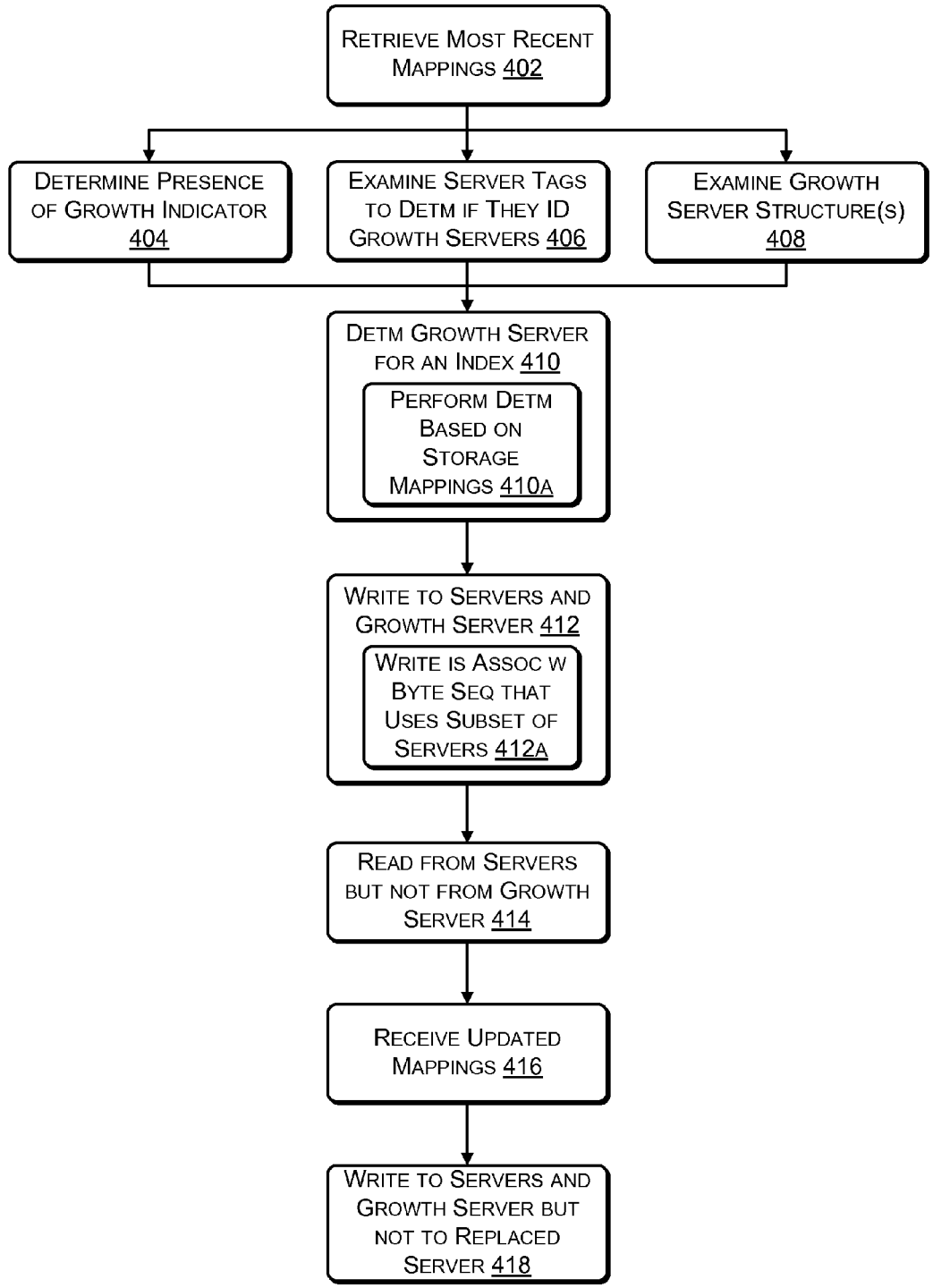
FIG. 4 illustrates a flowchart of example operations of a client device for performing read and write operations before, during, and after the replacement of a server replica with respect to a storage index, in accordance with various embodiments.

FIG. 4 illustrates a flowchart of example operations of a client device for performing read and write operations before, during, and after the replacement of a server replica with respect to a storage index, in accordance with various embodiments. As illustrated at block 402, the client device retrieves the most recent version of the storage assignment mappings from the metadata server responsive to transmitting an initial write request associated with a storage index to a set of server replicas and receiving, in response, an indication that a version of storage assignment mappings utilized by the client device is not a most recent version.

Following the retrieval of the storage assignment mappings, the client device may determine, at block 404, that a growth indicator associated with the storage index indicates that growth server(s) are designated to replace server replica(s) associated with the storage index. Alternatively, the client device may examine, at block 406, tags associated with identifiers of the one or more server replicas, the tags including identifiers of corresponding growth server(s). Further, the client device may instead examine, at block 408, a growth server data structure to determine whether the data structure includes any growth servers.

At block 410, the client device then determines growth server(s) designated to replace corresponding server replica(s) of a set of server replicas associated with a storage index. At block 410a, the determining may be based on storage assignment mappings associating each of a plurality of storage indices with a set of server replicas. In some embodiments, the storage assignment mappings are a table with one of rows or columns representing storage indices and the other of rows or columns representing server replicas and growth servers, the growth servers being represented in one or both of first or second ones of the other of the rows or columns. In other embodiments, the storage assignment mappings are a table with one of rows or columns representing storage indices and the other of rows or columns representing server replicas and growth servers, and one or more of the other of the rows or columns representing server replicas and growth servers is associated with a growth indicator that indicates that those one or more of the other of the rows or columns include identifiers of growth servers in their associated fields. These one or more of the other of the rows or columns may be the growth server data structure mentioned above. In various embodiments, determining the growth server(s) may further include determining the server replica(s) designated to be replaced by the growth server(s) by examining tags associated with identifiers of the growth server(s), the tags including identifiers of the designated server replica(s).

At block 412, the client device then transmits a write request associated with the storage index to the set of server replicas and the one or more growth servers. In some embodiments, at block 412a, the write request is associated with a byte sequence that utilizes a subset of server replicas associated with the storage index and the subset of server replicas comprises the set of server replicas. In such embodiments, the storage index may be associated with a plurality of growth servers, and the client device may determine a subset of the plurality of growth servers as the growth server(s) designated to replace the server replica(s).

At block 414, the client device further reads data associated with the storage index from the set of server replicas without reading data from the growth servers.

At block 416, the client device receives an updated version of storage assignment mappings identifying the growth server(s) as server replicas included in the set of server replicas upon replacement of the server replica(s) with the corresponding growth server(s) with respect to the storage index.

At block 418, the client device then transmits write requests associated with the storage index to the set of server replicas without transmitting the write requests to the replaced server replica(s).

Figure 5:
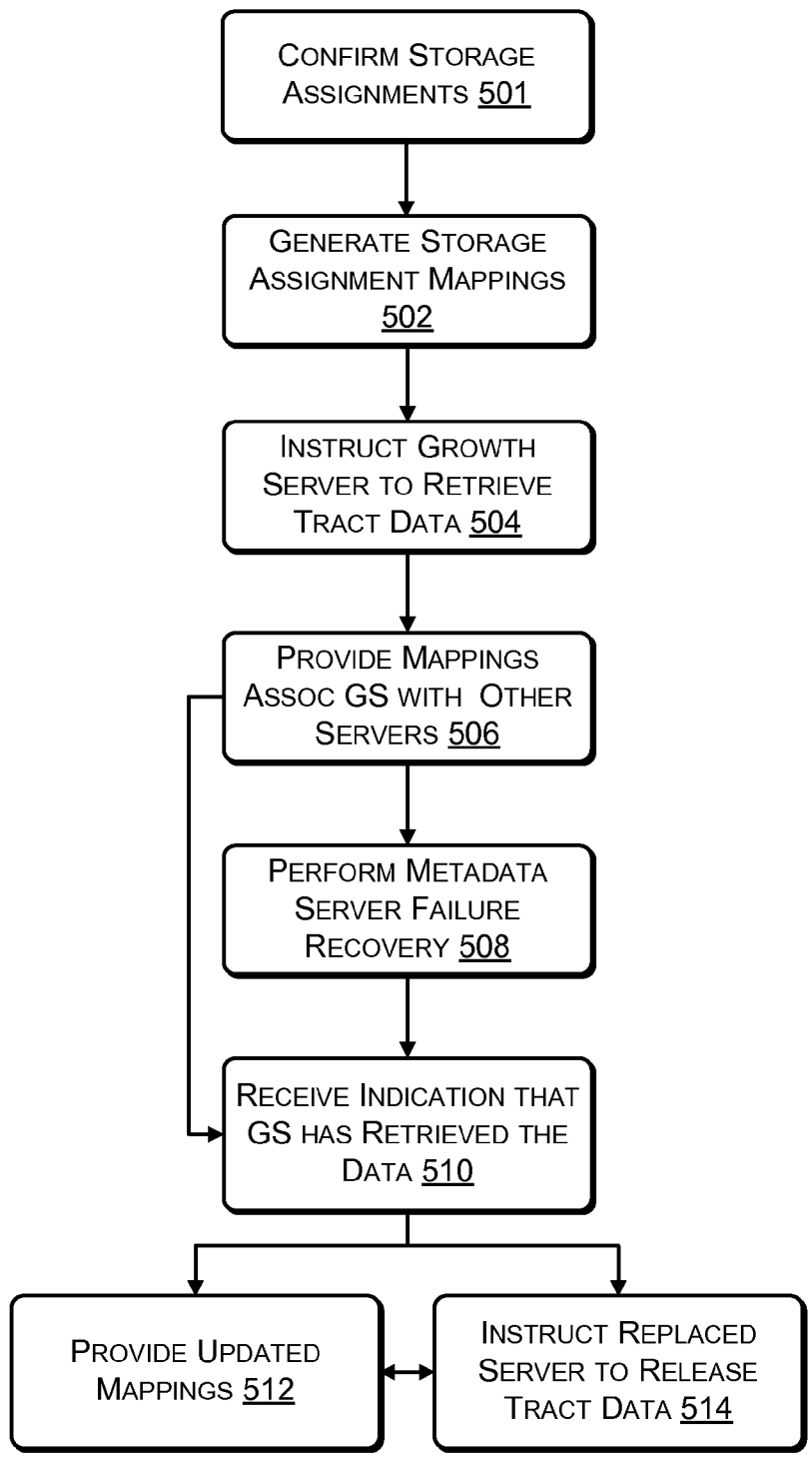
FIG. 5 illustrates a flowchart of example operations of a metadata server for updating storage assignment mappings responsive to the replacement of server replicas and for recovering those mappings in the event of metadata server failure, in accordance with various embodiments.

FIG. 5 illustrates a flowchart of example operations of a metadata server for updating storage assignment mappings responsive to the replacement of server replicas and for recovering those mappings in the event of metadata server failure, in accordance with various embodiments. As illustrated at block 501, a metadata server provides storage assignments to a growth server and receives confirmation from the growth server that it accepts the storage assignments. At block 502, the metadata server generates storage assignment mappings by associating the growth server with storage indices corresponding to the storage assignments and setting a version identifier associated with the storage assignment mappings.

At block 504, the metadata server instructs a growth server designated to replace a live server with respect to a storage index to retrieve data stored on the live server both from the live server and from other server replicas associated with the storage index. The growth server may also be designated to replace a different live server with respect to a different storage index.

At block 506, while the growth server retrieves the data, the metadata server provides storage assignment mappings associating the live server, growth server, and other server replicas with the storage index to one or more client devices to enable the client devices to transmit first write requests associated with the storage index to the live server, the growth server, and the other server replicas.

At block 508, in response to a metadata server failure or power cycle, the metadata server initiates a failure recovery process. The failure recovery process includes retrieving first identifications from live servers in a system of first storage indices associated with the liver servers and second identifications from growth servers in the system of second storage indices associated with the growth servers. The second identifications from the growth servers are accompanied by indications that the growth servers are in growth states with respect to the second storage indices. The failure recovery process further includes generating storage assignment mappings based on the retrieved first identifications, second identifications, and indications.

At block 510, when the growth server has completed the growth phase, the metadata server receives an indication from the growth server that the growth server has retrieved the data.

At block 512, the metadata server then provides to the one or more client devices updated storage assignment mappings replacing the live server with the growth server with respect to the storage index, the updated storage assignment mappings enabling the client devices to transmit second write requests to the growth server and the other server replicas without transmitting the second write requests to the live server.

At block 514, before, during, or after performing the providing of the updated storage assignment mappings, the metadata server instructs the live server to release storage resources associated with the storage index.

Example Computer System Architecture

FIG. 6 illustrates a block diagram showing components of a computer system 600 such as a client device 102, a server replica 104, a metadata server 106, or a growth server 124, in accordance with various embodiments. In various embodiments, computer system 600 may include at least one processing unit 602. The processing unit 602 may be any sort of processing unit. The processing unit 602 may also or alternatively include one or more graphic processing units (GPUs).

System memory 604 of the computer system 600 may store program instructions that are loadable and executable on the processor(s) 602, as well as data generated during the execution of these programs. Depending on the configuration and type of computing device, system memory 604 may be volatile (such as random access memory (RAM)) and/or non-volatile (such as read-only memory (ROM), flash memory, etc.). The computer system 600 may also include additional removable storage 612 and/or non-removable storage 614 including, but not limited to, magnetic storage, optical disks, and/or tape storage. The disk drives and their associated computer-readable media may provide non-volatile storage of computer readable instructions, data structures, program modules, and other data for the computing devices. In some implementations, the system memory 604 may include multiple different types of memory, such as static random access memory (SRAM), dynamic random access memory (DRAM), or ROM.

Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, erasable programmable read-only memory (EEPROM), flash memory or other memory technology, compact disc read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. System memory 604, removable storage 612, and non-removable storage 614 are examples of computer storage media.

In contrast, communication media may embody computer readable instructions, data structures, program modules, or other data in a modulated data signal, such as a carrier wave, or other transmission mechanism. As defined herein, computer storage media does not include communication media.

As further shown in FIG. 6, the system memory 604 may store an operating system 606, program modules 608, and program data 610. The operating system 606 may be any sort of operating system or operating systems known in the art. The program modules 608 and program data 610 may include any one or more of the storage assignment mappings 108, the client library 114, the storage assignments 118, the tract data 120, the growth management module 126, the storage assignments 132, the storage assignments 148, or the recovery module 302, these components being described above in greater detail.

Computer system 600 may also have input device(s) 616 such as a keyboard, a mouse, a touch-sensitive display, voice input device, etc. Output device(s) 618 such as a display, speakers, a printer, etc. may also be included. These devices are well known in the art and need not be discussed at length here.

Computer system 600 may also contain communication connections 620 that allow the device to communicate with other computing devices 622. The communication connections 620 are implemented at least partially by network interface components. The other computing devices 622 may be any of the client device 102, the server replica 104, the metadata server 106, or the growth server 124. For example, the metadata server 106 may be a computing system 600 and a server replica 104 may be another computing device 622 which communicates with the metadata server 106 using the communication connections 620.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method comprising:
    transmitting, by a client device, an initial write request to a set of servers replicas;
    receiving, by the client device, in response to the initial write request an indication that a version of storage assignment mappings utilized by the client device is not a most recent version;
    retrieving the most recent version of the storage assignment mappings;
    determining, by the client device, one or more growth servers designated to replace a corresponding one or more server replicas of the set of server replicas associated with a storage index; and
    transmitting, by the client device, a write request associated with the storage index to the set of server replicas and the one or more growth servers.

2. The method of claim 1, further comprising reading data associated with the storage index from the set of server replicas without reading data from the growth servers.

3. The method of claim 1, further comprising performing the determining based on storage assignment mappings associating each of a plurality of storage indices with a set of server replicas.

4. The method of claim 3, wherein the storage assignment mappings are a table with:
    rows representing storage indices and columns representing server replicas and growth servers, and the growth servers are represented in one or both of first or second ones of the columns, or
    columns representing storage indices and rows representing server replicas and growth servers, and the growth servers are represented in one or both of first or second ones of the rows.

5. The method of claim 3, wherein the storage assignment mappings are a table with:
    rows representing storage indices and columns representing server replicas and growth servers, and one or more of the columns are associated with a growth indicator that indicates that those one or more columns include identifiers of growth servers in their associated fields, or
    columns representing storage indices and rows representing server replicas and growth servers, and one or more of the rows are associated with a growth indicator that indicates that those one or more rows include identifiers of growth servers in their associated fields.

6. The method of claim 1, further comprising determining that a growth indicator associated with the storage index indicates which growth servers are designated to replace given server replicas associated with the storage index, and, in response, performing the determining of the growth servers.

7. The method of claim 1, wherein the determining includes examining tags associated with identifiers of the one or more server replicas, the tags including identifiers of the corresponding one or more growth servers.

8. The method of claim 1, further comprising determining the one or more server replicas designated to be replaced by the one or more growth servers by examining tags associated with identifiers of the one or more growth servers, the tags including identifiers of the designated one or more server replicas.

9. The method of claim 1, wherein the write request is associated with a byte sequence that utilizes a subset of server replicas associated with the storage index and the subset of server replicas comprises the set of server replicas.

10. The method of claim 9, wherein the storage index is associated with a plurality of growth servers, and the method comprises determining a subset of the plurality of growth servers as the one or more growth servers designated to replace the one or more server replicas.

11. A client device comprising:
    a processor; and
    a plurality of instructions configured to be executed by the processor to perform operations including:
        transmitting an initial write request to a set of servers replicas;
        receiving in response to the initial write request an indication that a version of storage assignment mappings utilized by the client device is not a most recent version; and
        retrieving the most recent version of the storage assignment mappings
        determining whether one or more growth servers are designated to replace a corresponding one or more server replicas of set of server replicas associated with a storage index; and
        in response to determining that growth servers are designated to replace corresponding server replicas, writing data associated with the storage index to the set of server replicas and the one or more growth servers, and reading data associated with the storage index from the set of server replicas without reading data from the growth servers.

12. The client device of claim 11, wherein the operations further include, upon replacement of the one or more server replicas with the corresponding growth servers with respect to the storage index, receiving an updated version of storage assignment mappings identifying the one or more growth servers as server replicas included in the set of server replicas associated with the storage index.

13. The client device of claim 12, wherein the operations further include, after receiving the updated version of the storage assignment mappings, transmitting write requests associated with the storage index to the set of server replicas without transmitting the write requests to the replaced one or more server replicas.

14. One or more computer-readable storage media including a plurality of computer-executable instructions stored thereon and configured to program a metadata server to perform operations comprising:
    instructing a growth server designated to replace a live server with respect to a storage index to retrieve data stored on the live server both from the live server and from other server replicas associated with the storage index;
    while the growth server retrieves the data, providing storage assignment mappings associating the live server, the growth server, and other server replicas with the storage index to one or more client devices to enable the client devices to transmit first write requests associated with the storage index to the live server, the growth server, and the other server replicas;

receiving an indication from the growth server that the growth server has retrieved the data; and in response to receiving the indication, providing to the one or more client devices updated storage assignment mappings replacing the live server with the growth server with respect to the storage index, the updated storage assignment mappings enabling the client devices to transmit second write requests to the growth server and the other server replicas without transmitting the second write requests to the live server.

15. The one or more computer-readable storage media of claim 14, wherein the updated storage assignment mappings comprise updated storage assignment mappings for a subset of storage indices included in a larger set of storage assignment mappings, each storage index having an associated version identifier and a number of associated server replicas.

16. The one or more computer-readable storage media of claim 14, wherein the operations further comprise generating the storage assignment mappings, the generating including associating the growth server with the storage index and setting a version identifier associated with the storage assignment mappings.

17. The one or more computer-readable storage media of claim 14, wherein the operations further comprise, responsive to receiving the indication, instructing the live server to release storage resources associated with the storage index.

18. The one or more computer-readable storage media of claim 14, wherein the growth server is also designated to replace a different live server with respect to a different storage index.

19. The one or more computer-readable storage media of claim 14, wherein the operations further comprise initiating a failure recovery process in response to failure of the metadata server, the failure recovery process including:

retrieving first identifications from live servers in a system of first storage indices associated with the live servers and second identifications from growth servers in a system of second storage indices associated with the growth servers, the second identifications from the growth servers being accompanied by indications that the growth servers are in growth states with respect to the second storage indices; and generating storage assignment mappings based on the retrieved first identifications, second identifications, and indications.

* * * * *